(12) United States Patent
Gau et al.

(10) Patent No.: US 8,072,500 B2
(45) Date of Patent: Dec. 6, 2011

(54) VIBRATION COMPENSATION METHOD FOR IMAGE CAPTURE DEVICE

(76) Inventors: Ken J. Gau, San Jose, CA (US);
Chao-Yu Yang, Taipei (TW)

( * ) Notice: Subject to any disclaimer, the term of this patent is extended or adjusted under 35 U.S.C. 154(b) by 616 days.

(21) Appl. No.: 12/261,724

(22) Filed: Oct. 30, 2008

(65) Prior Publication Data

US 2009/0195665 A1    Aug. 6, 2009

(30) Foreign Application Priority Data

Feb. 5, 2008 (TW) ................................ 97104743 A

(51) Int. Cl.
*H04N 5/228* (2006.01)
(52) U.S. Cl. ................. 348/208.6; 375/240.19
(58) Field of Classification Search ............... 348/208.6; 375/240.24, 240.19
See application file for complete search history.

(56) References Cited

U.S. PATENT DOCUMENTS 5,347,308 A * 9/1994 Wai .......................... 375/240.23

2008/0137750 A1 * 6/2008 Burns et al. ............... 375/240.19
2010/0214425 A1 * 8/2010 Huang et al. .............. 348/208.99

* cited by examiner

*Primary Examiner* — Jason Chan
*Assistant Examiner* — Cynthia Calderon

(57) ABSTRACT

A vibration compensation method for an image capture device comprising calculating the absolute difference values or the squared difference values between each first block of pixels of a base field and a second block of pixels corresponding thereto as well as other neighboring blocks of pixels in a comparison region in a reference field and choosing the interlace process modules of allowing the first block of pixels to interlace with the second block of pixels to form a image block, allowing the first block of pixels to interlace with the other neighboring block of pixels to form an image block and allowing the first block of pixels to interlace with a duplicated first block of pixels to form an image block, to combine an image depending on whether the absolute difference value or the squared difference values is smaller than a preset value or not thereby compensating the vibration factors as an image capture device is capturing an image to obtain a clear image.

11 Claims, 4 Drawing Sheets

H-1 continuously in sequence.
VIBRATION COMPENSATION METHOD FOR IMAGE CAPTURE DEVICE

CROSS REFERENCE TO RELATED DOCUMENT

This application claims priority to TAIWAN Patent Application No. 097104743, filed on Feb. 5, 2008.

BACKGROUND OF THE INVENTION

1. Field of the Invention

The present invention relates to an image capture device, and more particularly to a vibration compensation method for an image capture device when it is being used for taking a photograph.

2. Description of Related Art

Any sensor such as charge coupled device (CCD), complementary metal oxide semiconductor (CMOS), infrared ray sensor, ultraviolet ray sensor or laser sensor is used in a digital camera, a digital video camera or any digital image capture device to obtain light speed, heat intensity, ultraviolet ray intensity or laser intensity. And then, an image process program is used to operate data obtained from the CCD, the CMOS or any one of the aforementioned sensors to obtain a photo or a video. Digital images are stored in a dynamic random access memory (DRAM), Synchronous Dynamic Random Access Memory (SDRAM) or other electronic memory.

A vibration of a digital image capture device is caused from a tremble or moving of a photographer's hand or a moving of a digital image capture device, and a picture capturing of the sensors mentioned above. A blurred photo or the blurred video will be yielded when the digital image capture device is object to a vibration such that a photographer will obtain the vague photo or film. A stable tripod may guarantee a definition of a photo or the video, but a vibration yielded on a digital image capture device provided with an image stabling function must be allowed to reduce, a clear photo or the clear video can then be photographed when no tripod is available.

There are various technologies of allowing a digital camera to take a photo of an image stably, for example, a digital image capture device and a method of anti-vibration disclosed in Taiwan Patent Publishing No. 200729938, a lens vibration reduction structure and a digital camera lens therewith disclosed in Taiwan Patent Publishing No. 200726205, a camera with an anti-shaking device disclosed in Taiwan Patent Publishing No. 200638153, an image-capture device with a position detector for vibration reduction disclosed in U.S. Pat. No. 7,161,621, an image stabilization apparatus disclosed in U.S. Pat. No. 7,162,531 and a vibration reduction zoom lens system disclosed in U.S. Pat. No. 7,209,299.

An image stabilization technology is used on a camera and a lens. A mini-gyroscope is used in conventional image stabilizing camera device to cancel out a vibration to allow the camera to generate a clear photo; this is a mechanical method of reducing vibrations of a camera and lens. But, the cost of this method is very high. However, a volume of the gyroscope occupies a limited space of the camera, but a photo taken by such kind of camera sometimes is not clear enough to satisfy a user asking for a higher demand.

SUMMARY OF THE INVENTION

For replacing a conventional vibration reduction structure with a digital image process method to allow an image capture device to capture a clear photo or the clear video or a moving device to attain to the vibration reduction effect, the present invention is proposed.

The present invention is to provide a vibration compensation method for an image capture device, allowing the production cost of the digital image capture device to be reduced without needing a disposition of a vibration reduction structure.

The present invention is to provide a vibration compensation method for an image capture device, allowing a space needed for disposition of a vibration reduction structure in a digital image capture device to be reduced and capable of taking a more stable image.

BRIEF DESCRIPTION OF THE DRAWINGS

The present invention can be understood by reference to the following description and accompanying drawings, in which.

DETAILED DESCRIPTION OF THE PREFERRED EMBODIMENTS

Figure 1A:
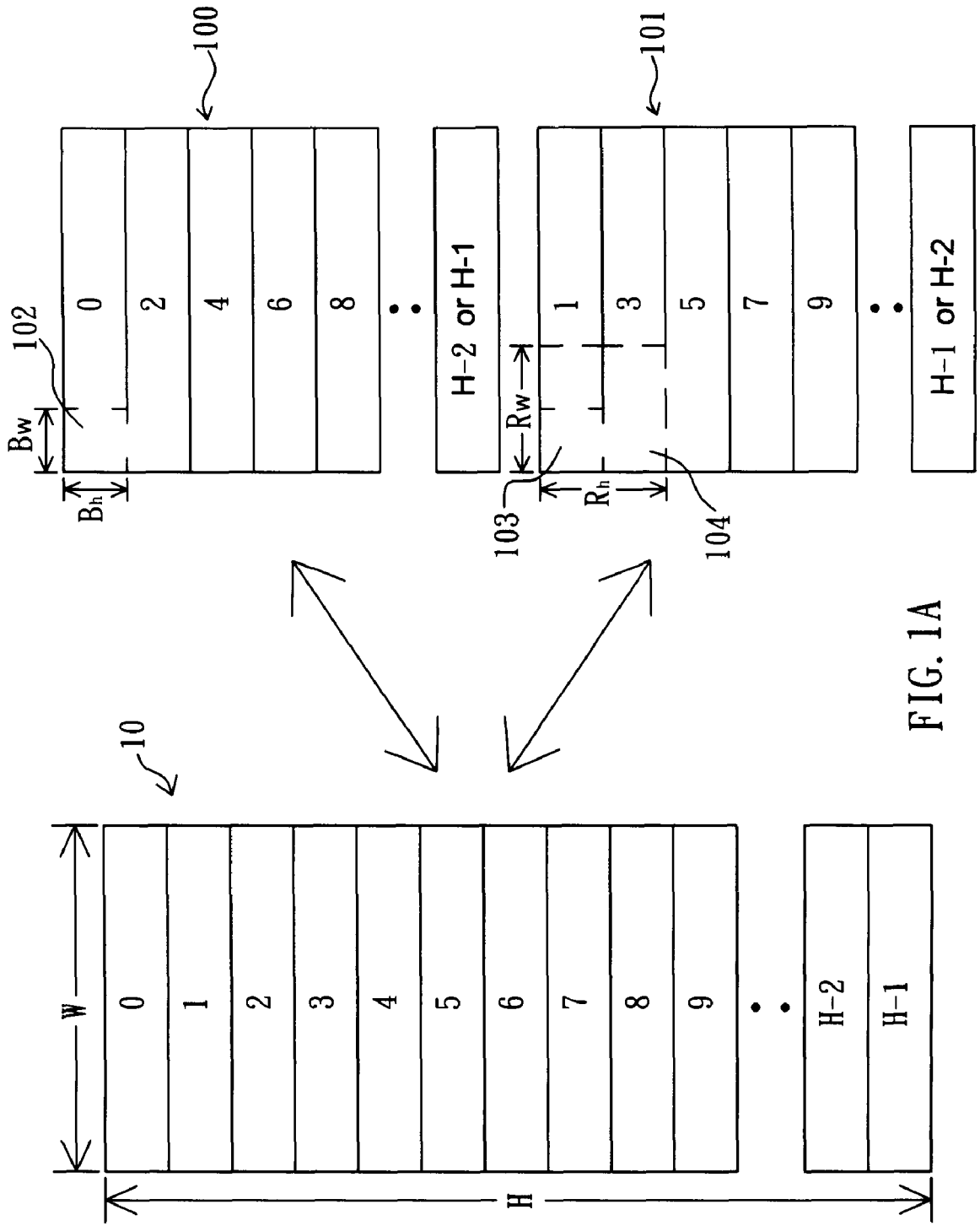
FIG. 1A is a schematic view of dividing a captured image into a base field and a reference field respectively.
Figure 1B:
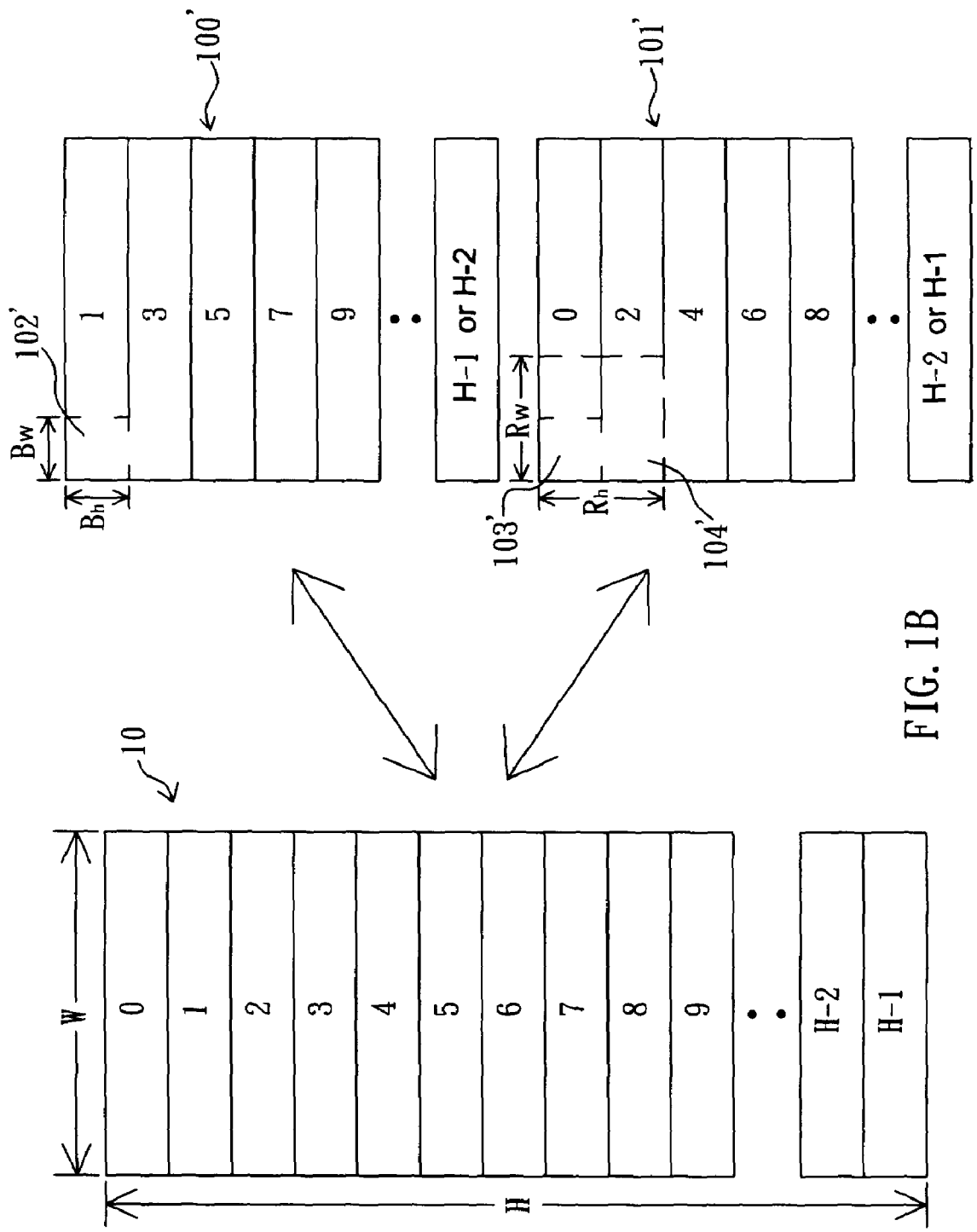
FIG. 1B is another schematic view of dividing a captured image into a base field and a reference field respectively.

Refer to FIGS. 1A and 1B. A CCD, CMOS or any one of the sensors mentioned above of a digital image capture device may generally be used for capturing an image 10. The digital image pixel block is defined as (W,H), in which W is an output digital image pixel width and H is an output digital image pixel height. The output digital image pixel may be divided into top-down scan lines 0, 1, 2, 3, 4, 5 . . . H-1. When the digital image capture device captures an image 10, it may capture image data of the top-down scanlines 0, 1, 2, 3, 4, 5 . . . H-1 continuously in sequence.

The digital image capture device of the present invention first captures the image data of the scanlines 0, 2, 4 . . . H-2 or H-1 intermittently and sequentially to form an even field or a field defined as a base field 100, and then captures the image data of the scanlines 1, 3, 5 . . . H-1 or H-2 intermittently and sequentially to form an odd field or a field defined as a reference field 101 after a time period equal to, larger than or smaller than one sixtieth seconds. Thereafter, the base field 100 and the reference field 101 are interlaced with each other to form an image 10, as FIG. 1A shows. Otherwise, the digital image capture device of the present invention first captures the image data of the scanlines 1, 3, 5 . . . H-1 or H-2 intermittently and sequentially to form an odd field or a field defined as a base field 100', and then captures the image data of the scanlines 0, 2, 4 . . . H-2 or H-1 intermittently and sequentially to form an even field or a field defined as a reference field 101' after a time period equal to, larger than or smaller than one sixtieth seconds. Thereafter, the base field 100 and the reference field 101 are interlaced with each other to form an image 10, as FIG. 1B shows.

The base fields 100, 100' and the reference fields 101, 101' may respectively be divided into a plurality of blocks of pixels with their positions and dimensions corresponding to each other, and a plurality of comparison regions 104, 104' are set in the reference fields 101, 101'. Dimensions of the blocks of pixels 102, 102', 103 and 103' are the same, and the block of pixels 103, 103' are included in or equal to the comparison regions 104, 104'.

A starting position of the blocks of pixels 103 in the reference field 101 is unnecessary to be the same as a starting position of the block of pixels 102 in the base field 100. Dimension ranges of the blocks of pixels 102 and 103 are respectively defined as (Bw, Bh), in which Bw is a width of the block of pixels, Bh is a height of the block of pixels. Bw and Bh may be any combination in one block, and BW is not larger than W, Bh is not larger than H. The blocks of pixels 102 and 103 may respectively have a different pixel piece such as 64×64 pixel piece, 128×64 pixel piece. The comparison regions 104 are located in the reference field 101. The comparison region 104 may be defined as (Rw, Rh), in which Rw is a width of the comparison region and Rh is a height of the comparison region. Rw and Rh may be any combination in one comparison region, and Bw≦Rw≦W, Bh≦hw≦H. The comparison may have a different pixel piece such as 128×128 pixel piece, 256×128 pixel piece. A time difference that the two corresponding blocks of pixels 102 and 103 are captured approximately is equal to, larger than or smaller than one sixtieth seconds. The sum of absolute difference (SAD) or sum of squared difference (SSD) are used to calculate the difference between blocks, and the calculated difference value of both SAD and SSD is called difference value. If a difference value between the two blocks of pixels 102 and 103 is smaller than a preset value, the two blocks of pixels 102 and 103 is then allowed to interlace each other accordingly to form an image block; if the difference value is not smaller than the preset value, the difference values between the other same size of block of pixels adjacent to or close to the block of pixels 103 and the block of pixels 102 may further respectively be calculated in the comparison region 104, if a certain difference value is smaller than the preset value, the block of pixels 102 and the certain other block of pixels adjacent or close to the block of pixels 103 may then be allowed to interlace each other accordingly to form an image block; if all difference values are not smaller than the preset value, it means that the block of pixels 102 is unable to be interlaced with the block of pixels in the reference field 101 to form an image block. Hence, it is forced to interlace the two same blocks of pixels 102 to form an image block.

A vibration factor can then be compensated to obtain a clear image when an image capture device is capturing an image 100 by calculating from left to right and from top to bottom a difference value between each block of pixels such as the block of pixels 102 in the base field 100 (even field) and a corresponding block of pixels such as the block of pixels 103 in the reference field (odd field) by means of the interlace process mentioned above.

Figure 2:
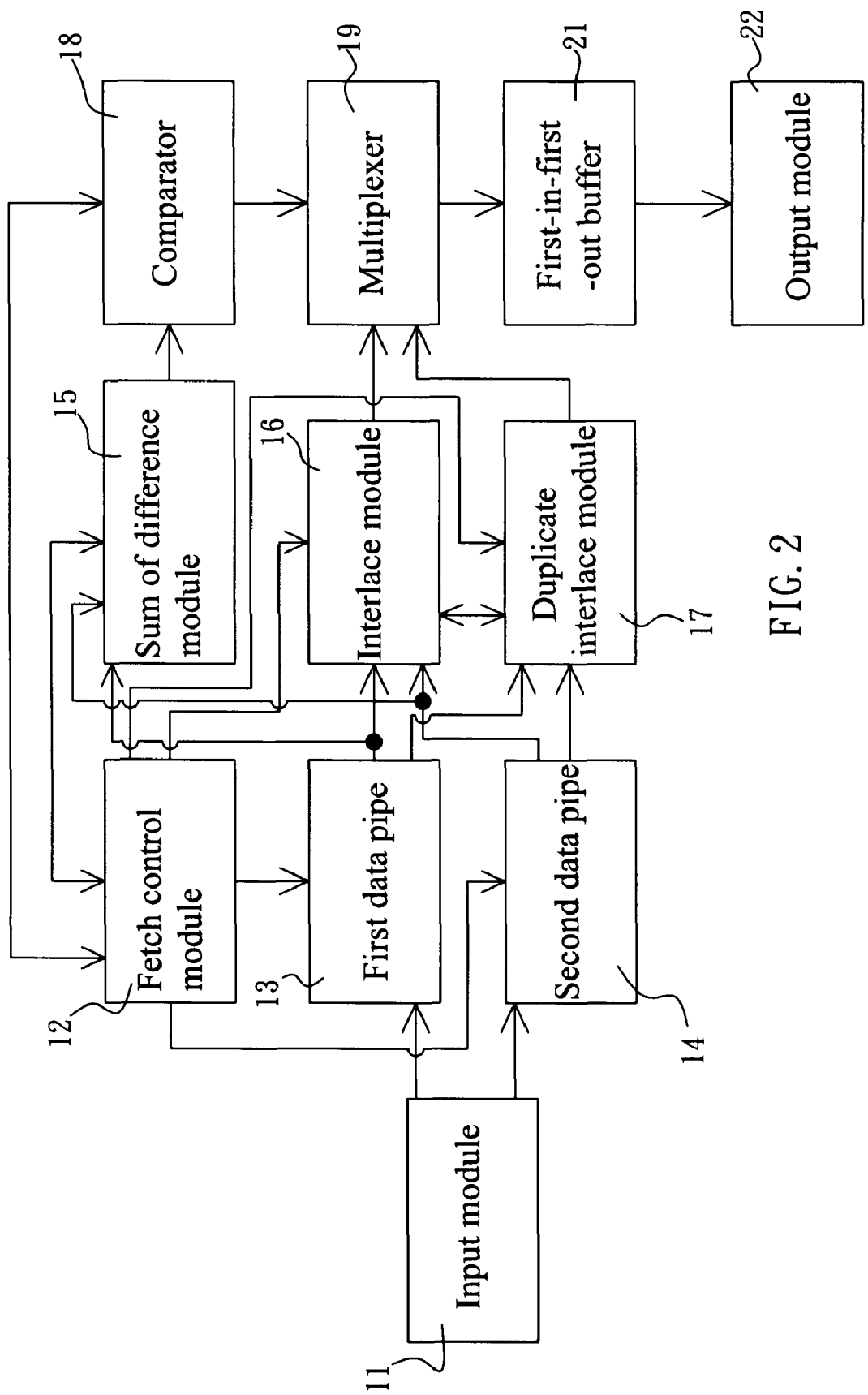
FIG. 2 is a block diagram, showing a functional structure used for taking a vibration compensation method for an image capture device according to the present invention into practice.

Please refer to FIG. 2. Forming an image block in a vibration compensation method for an image capture device of a preferred embodiment according to the present invention comprises the following steps:

transmitting a plurality of blocks of pixels of a base field to a first data pipe 13, and then transmitting a plurality of blocks of pixels of a reference field to a second data pipe 14 through an input module 11;

controlling the first data pipe 13 and the second data pipe 14 through a fetch control module 12, allowing a first block of pixels in the base field and a second block of pixels corresponding to the firs block of pixels in the reference field to be respectively transmitted to a sum of difference module 15 such as a sum of absolute difference module (SADM), an interlace module 16 and a duplicate interlace module 17, in which the sum of absolute difference module may be replaced with other sum of difference module such as sum of squared difference module (SSDM).

Calculating a difference value(S) between the first block of pixels and the second block of pixels through the sum of a difference module 15;

Comparing the difference value (S) with a preset value (A) through a comparator 18; if S is smaller than A, outputting a first message and stopping the comparison; if S is not smaller than A, outputting a second message to express that further comparisons between the first block of pixels and other neighboring blocks of pixels in a comparison region of the reference field is needed, further controlling the second data pipe 14 to transmit one of the other neighboring blocks of pixels in the comparison region sequentially to the sum of difference module 15, the interlace module 16 and duplicate interlace module 17 when the fetch control module 12 detects that the comparator 18 outputs the second message, and then calculating difference values (S1) between the first block of pixels and one of the other neighboring blocks of pixels through the sum of difference module 15, next, comparing S1 with A through the comparator 18 sequentially, if S1 is smaller than A, then outputting the first message and stopping the comparison, if S1 is not smaller than A, the comparator 18 will further controlling the second data pipe 14 to transmit one of the other neighboring blocks of pixels in the comparison region and do the process again, if all S1s are not smaller than A, then outputting a third message to express that the comparisons between the first block of pixels and all of the other neighboring blocks of pixels are completed and a compensation cannot be obtained by interlacing the first block of pixels and any of the other neighboring blocks of pixels;

Controlling an image block output from the interlace module 16 obtained by interlacing the first block of pixels with the second block of pixels or the other neighboring block of pixels when a multiplexer (MUX) 19 detects that the comparator 18 outputs the first message to transmit to an output module 22 through a first-in-first-out (FIFO) buffer 21; if the multiplexer 19 detects the third message output from the comparator 18, controlling an image block obtained by interlacing the two first blocks of pixels output from the duplicate interlace module 17 to transmit to the output module 22 through FIFO buffer 21, in which the duplicate interlace module first duplicates the first block of pixels and then interlace the two first blocks of pixels with each other to form an image block. The duplicate interlace module 17 maybe includes the interlace module 16 and utilizes the interlace module 16 to interlace the two first blocks of pixels with each other to form an image block.

The base field and the reference field of the present embodiment may respectively be an even field and an odd field, or an odd field and an even field.

Figure 3:
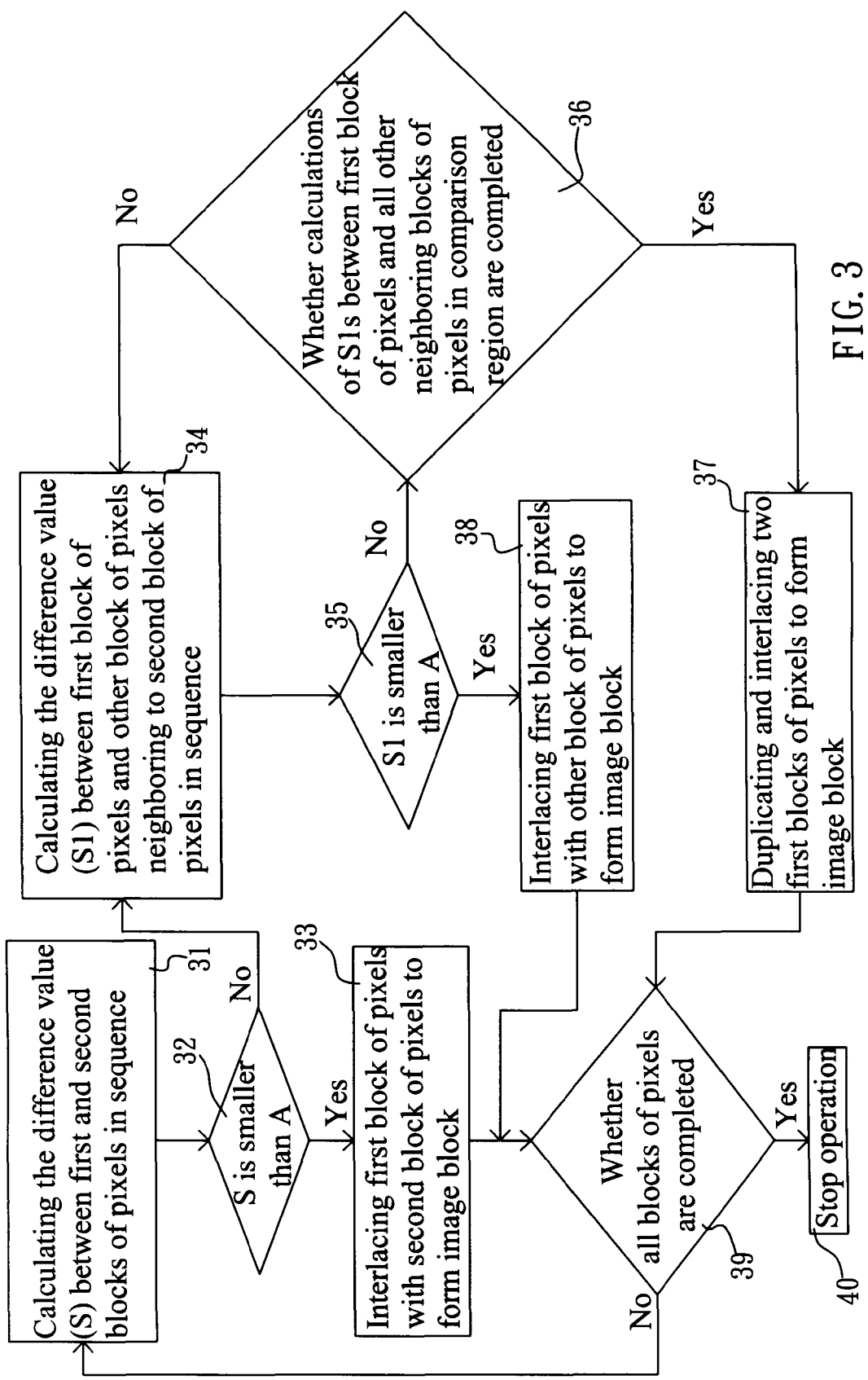
FIG. 3 is a flow chart, showing a vibration compensation method for an image capture device according to the present invention.

Please refer to FIG. 2 and 3. A vibration compensation method for an image capture device of a preferred embodiment according to the present invention comprises the following steps:

Step 31: Calculating the first difference value (S) between the first block of pixels of a base field and the second block of pixels of a reference field corresponding thereto through a sum of difference module 15;

Step 32: comparing the first difference value (S) with a preset value (A) through a comparator 18;

Step 33: if S is smaller than A, interlacing the first block of pixels with the second block of pixels to form an image block through an interlace module 16 and then transmitting the image block to an output module 22;

Step 34: if S is not smaller than A, calculating a second difference value (S1) between the first block of pixels and an other neighboring block of pixels in a comparison region comprising the second block of pixels in the reference field in sequence through the sum of difference module 15;

Step 35: comparing the second difference value (S1) with the preset value (A) through the comparator 18;

Step 36: if S1 is not smaller than A, judging whether the calculations of S1s between the first block of pixels and all other neighboring blocks of pixels in the comparison region are completed;

Step 37: if it is not completed, then continuing the steps of the calculation of S1 between the first block of pixels and the other neighboring block of pixels and the comparison with A, if it is completed and all S1s are not smaller than A, transmitting a image block to the output module 22 after a duplicate interlace module 17 duplicates the first block of pixels and interlaces the two first blocks of pixels to form the image block;

Step 38: if S1 is smaller than A, transmitting an image block to the output module 22 after the interlace module 16 interlaces the first block of pixels with the other neighboring block of pixels to form the image block;

Step 39: judging whether the combinations of the all blocks of pixels in the base field are completed through the fetch control module 12; if the combinations of the needed blocks of pixels of the base field are not completed, returning to Step 31, calculating another first difference value between a next first block of pixels and a next second block of pixels in the comparison region;

Step 40: if the combinations of the needed blocks of pixels of the base field are completed, then stop the operation.

The base field and the reference field of the present embodiment may respectively an even field and an even field or vice versa.

A vibration compensation method for an image capture device of the present invention calculates different values between each first block of pixels in a base field and a second block of pixels corresponding to the first block of pixels and other neighboring block of pixels in a comparison region in a reference field and chooses one of the interlace process modules of allowing the first block of pixels to interlace with the second block of pixels to form an image block, allowing the first block of pixels to interlace with the other neighboring block of pixels to form an image block and allowing the first block of pixels to interlace with a duplicated first block of pixels to form an image block to combine an image depending on whether the difference value is smaller than a preset value or not thereby compensating a vibration factor as an image capture device is capturing an image to obtain a clear image.

The present invention allows a digital image capture device to be unnecessary to be disposed with a vibration reduction structure so as to be able to reduce the production cost, a space needed for a disposition of the vibration reduction structure in the digital image capture device to be reduced and a more stable image can be captured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vibration compensation method for an image capture device comprising the following steps:

calculating difference values between each first block of pixels in a base field and a second block of pixels corresponding to said first block of pixels and other neighboring blocks of pixels of a comparison region in a reference field in sequence;

selecting one of interlace process modules of allowing said first block of pixels to interlace with said second block of pixels to form an image block, allowing said first block of pixels to interlace with said other neighboring block of pixels to form an image block and allowing said first block of pixels to interlace with a duplicated first block of pixels to form an image block to combine an image depending on whether one of the difference values is smaller than a preset value or not;

wherein said difference values sequential calculation is to match said selected interlace process module and comprises the following steps:

calculating a first difference value between said first block of pixels of said base field and said second block of pixels corresponding thereto of said reference field in sequence:

comparing said first difference value with said preset value;

transmitting an image block to an output module after interlacing said first block of pixels with said second block of pixels to form said image block if said first difference value is smaller than said preset value;

calculating second difference values in sequence between said first block of pixels and said other neighboring blocks of pixels in a comparison region, the comparison region comprising said second block of pixels and said other neighboring blocks of pixels, and then comparing one of said second difference values with said preset value if said first difference value is not smaller than said preset value;

if said second difference value is not smaller than said preset value, judging whether said calculations of said second difference values between said first block of pixels and all said other neighboring blocks of pixels are completed or not, if not completed, continuing said steps of calculating a second difference value between said first block of pixels and said other neighboring block of pixels in said comparison region and said comparison with said preset value, if completed and all said second difference values are not smaller than said preset value, transmitting an image block to said output module after duplicating said first block of pixels and then interlacing said two first blocks of pixels to form an image block;

if said second difference value is smaller than said preset value, transmitting an image block to said output module after interlacing said block of pixels with said other neighboring block of pixels to form said image block;

judging whether completing combinations of all blocks of pixels of said base field; and if said combinations of needed blocks of pixels of said base field is not completed, continuing said aforesaid steps until a combination operation of said needed blocks of pixels of said base field is completed.

2. The vibration compensation method for an image capture device according to claim 1, wherein said difference values are obtained by means of a calculation execution of a sum of difference module.

3. The vibration compensation method for an image capture device according to claim 2, wherein said comparison between said difference value and said preset value is executed by a comparator.

4. The vibration compensation method for an image capture device according to claim 3, wherein if said first difference value is smaller than said preset value, interlacing said first block of pixels with said second block of pixels to form said image block through an interlace module; if said second difference value is smaller than said preset value, interlacing said first block of pixels with said other neighboring block of pixels to form said image block through said interlace module.

5. The vibration compensation method for an image capture device according to claim 4, wherein said operation of duplicating said first block of pixels and then interlacing two said first blocks of pixels to form an image block is executed by a duplicate interlace module.

6. The vibration compensation method for an image capture device according to claim 5, wherein said first block of pixels is transmitted from an output module to said sum of difference module, said interlace module and said duplicate interlace module by controlling a first data pipe through a fetch control module; said second block of pixels and said other neighboring block of pixels are transmitted from said output module to said sum of difference module, said interlace module and said duplicate interlace module by controlling a second data pipe through a fetch control module.

7. The vibration compensation method for an image capture device according to claim 6, wherein said comparator outputs a first message if said first difference value is smaller than said preset value; said comparator outputs said first message if said second difference value is smaller than said preset value; said comparator outputs a second message if said first absolute difference value is not smaller than said preset value; said comparator outputs said second message if said second difference value is not smaller than said preset value; said comparator outputs a third message if all said second absolute difference values are not smaller than said preset value; a multiplexer controls said image block output from said interlace module to transmit to said output module via a first-in-first-out buffer while detecting that said comparator outputs said first message; said fetch control module controls said second data pipe to respectively transmit said other neighboring block of pixels to said sum of difference module, said interlace module and said duplicate interlace module from said output module while detecting that said comparator outputs said second message; said multiplexer controls said image block output form said duplicate interlace module to transmit to said output module via said first-in-first-out buffer while detecting that said comparator outputs said third message.

8. The vibration compensation method for an image capture device according to claim 7, wherein said base field and said reference field may respectively be an even field and an odd field.

9. The vibration compensation method for an image capture device according to claim 7, wherein said base field and said reference field may respectively be an odd field and an even field.

10. The vibration compensation method for an image capture device according to claim 7, wherein said sum of difference module is one of a sum of absolute difference module and a sum of squared difference module.

11. The vibration compensation method for an image capture device according to claim 7, wherein said difference values are one of absolute difference values and squared difference values.

* * * * *